United States Patent [19]
DeCanio

[11] Patent Number: 6,069,340
[45] Date of Patent: May 30, 2000

[54] ELECTRODE HOLDER MIRROR DEVICE

[75] Inventor: Paul Joseph DeCanio, 35 Franklin Ave., Brentwood, N.Y. 11717

[73] Assignee: Paul Joseph DeCanio, N.Y.

[21] Appl. No.: 09/299,129

[22] Filed: Apr. 26, 1999

[51] Int. Cl.[7] .................................................. B23K 9/12
[52] U.S. Cl. .................... 219/124.34; 219/138; 359/871; 359/881; 359/882
[58] Field of Search ............................... 219/124.34, 138; 359/881, 871, 882

[56] References Cited

U.S. PATENT DOCUMENTS

| | | | |
|---|---|---|---|
| 1,844,733 | 2/1932 | Wise | 359/882 |
| 1,907,314 | 5/1933 | Baer | 359/881 |
| 2,107,791 | 2/1938 | Henning | 240/2.18 |
| 2,241,584 | 5/1941 | Cohen | 359/882 |
| 2,581,304 | 1/1952 | Sims | 359/882 |
| 2,653,597 | 9/1953 | Canan | 359/882 |
| 4,599,506 | 7/1986 | Burke | 219/124.34 |
| 5,428,484 | 6/1995 | Baker | 359/872 |

*Primary Examiner*—Patrick Ryan

[57] ABSTRACT

An electrode holder mirror device for welding purposes and method therefor comprises a body structure which comprises an open sleeve member and a flange section. The flange section functions to releasably engage a handle portion of an electrode holder through usage of a fastening means. A telescoping mirror assembly comprises a telescoping male member releasably inserted into the open sleeve member at one end thereof. A mirror housing is rigidly affixed to a distal end of the telescoping male member. The telescoping male member and swivel means function to position the mirror rotationally about its longitudinal and latitudinal axes, allowing the device to be placed in a position to allow a welder to adequately view a process being performed. The position of the mirror about its longitudinal and latitudinal axes may adjusted manually or automatically, wherein a substantially crescent-shaped trigger mechanism allows a welder to adjust the mirror with one finger while wearing welding gloves. The mirror maybe of a variety of sizes and shapes, and further comprises a protective clear lens in the preferred mode. In all instances, the major components of the device maybe rubber-coated to prevent undesired short circuiting.

8 Claims, 2 Drawing Sheets

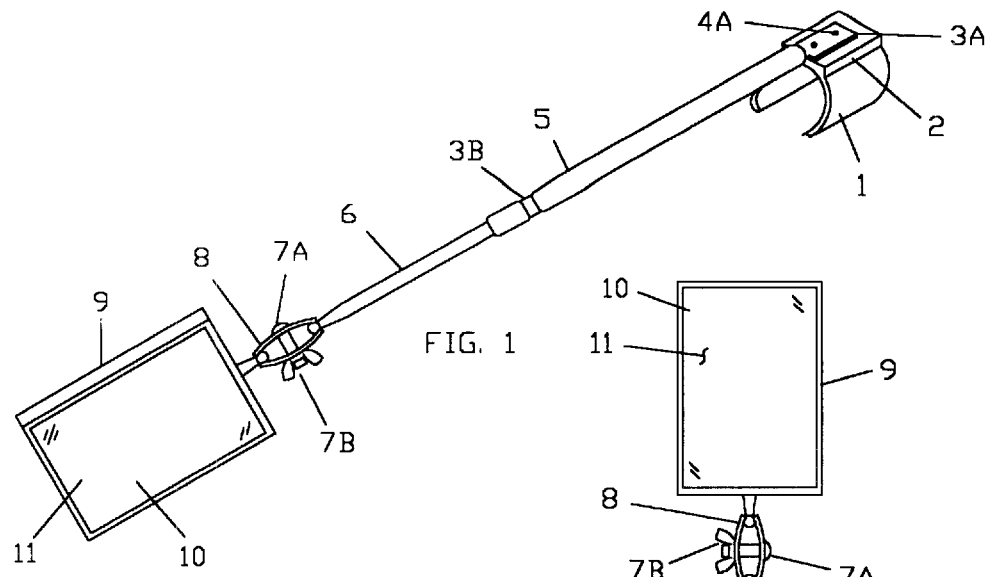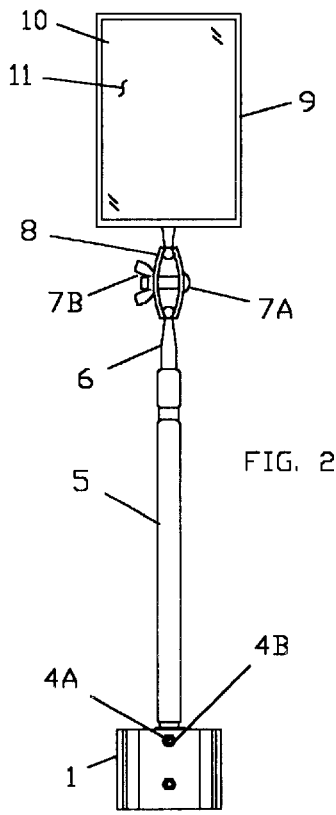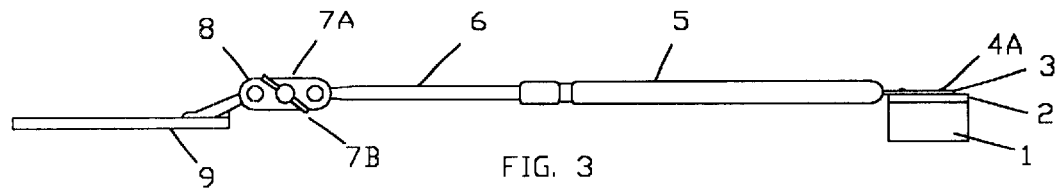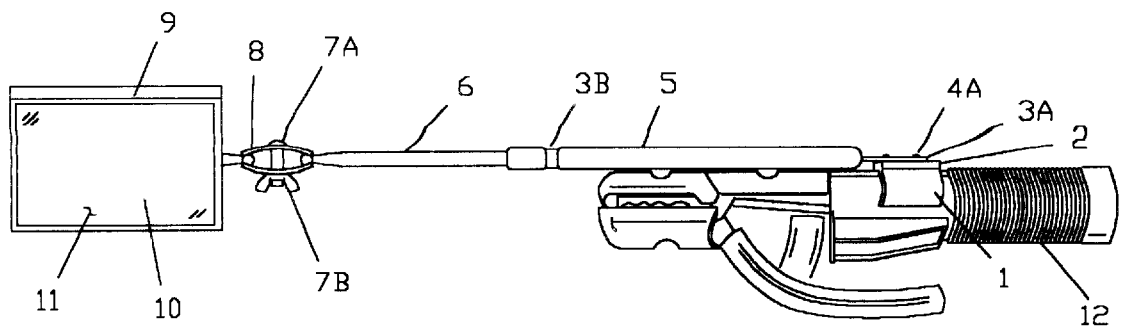

ELECTRODE HOLDER MIRROR DEVICE

BACKGROUND OF THE INVENTION

1. Field of the Invention

The invention relates generally to a device that positions a mirror rotationally about its longitudinal and latitudinal axes while affixed to a electrode holder by a removable fastening means.

2. Description of the Prior Art

Electrode holders are used for application of the welding electrode to join the weldments to be welded together, a problem that occurs is that a desired position by the welder cannot be obtained this makes welding very difficult and in some cases impossible. This problem is overcome by this invention.

SUMMARY OF THE INVENTION

The invention relates to a device to allow a electrode holder to be positioned in a undesired position which allows the welder to see the process being performed. It comprises a means for attaching the invention to the electrode holder, a resistibly rotating means a extention structure and a mirror.

It is an object of the invention to provide an inexpensive device which will allow more efficient use of a electrode holder, which will increase worker productivity.

BRIEF DESCRIPTION OF THE DRAWINGS

FIG. 1 is a elevation view showing an embodiment of the electrode holder mirror device.

FIG. 2 is a front view showing an embodiment of the electrode holder mirror device.

FIG. 3 is a side view showing an embodiment of the electrode holder mirror device.

FIG. 4 is a side view showing yet another embodiment of the electrode holder mirror device installed on the electrode holder.

DESCRIPTION OF THE PREFERRED EMBODIMENT

Figure 5:
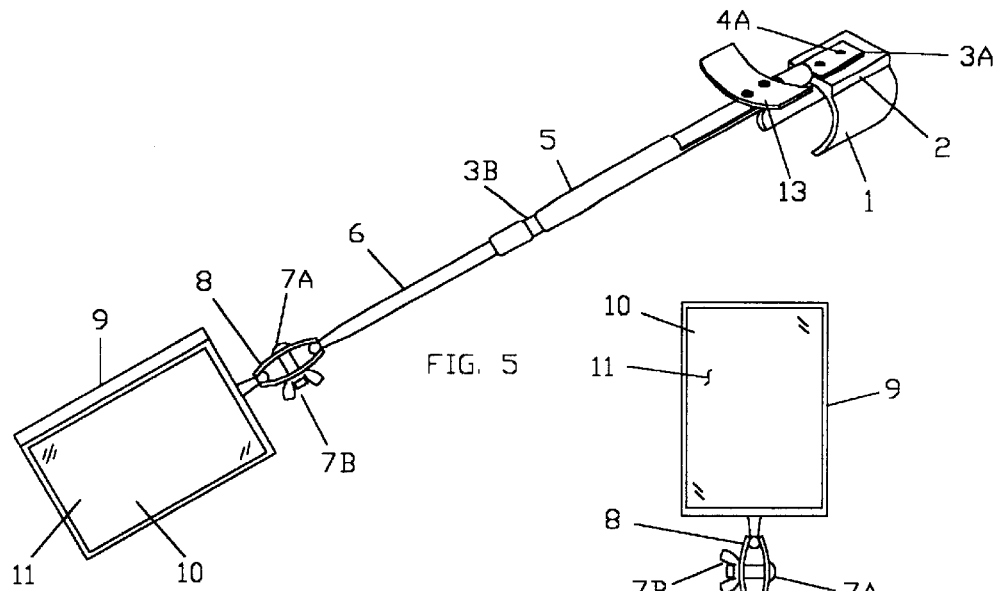
FIG. 5 is a elevation view showing the embodiment of the electrode holder mirror device with a crescent-shaped trigger mechanism.
Figure 6:
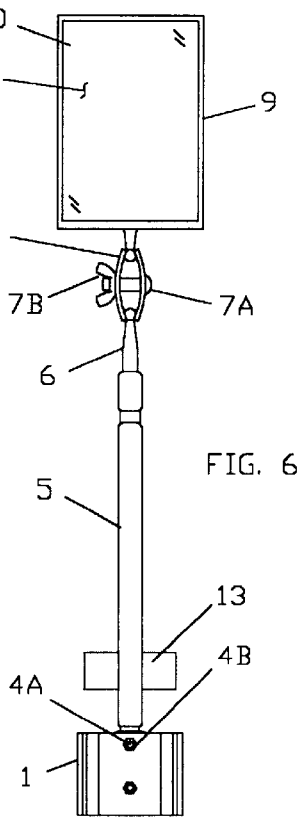
FIG. 6 is a front view showing the embodiment of the electrode holder mirror device with a crescent-shaped trigger mechanism.
Figure 7:
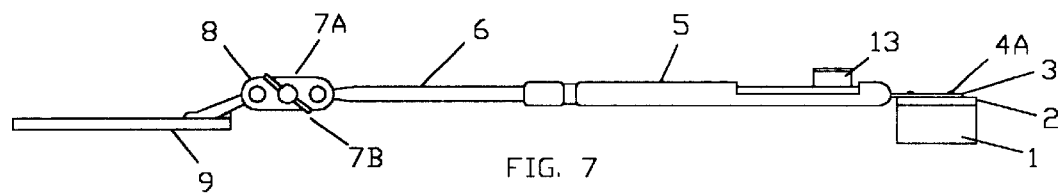
FIG. 7 is a side view showing the embodiment of the electrode holder mirror device with a crescent-shaped trigger mechanism.
Figure 8:
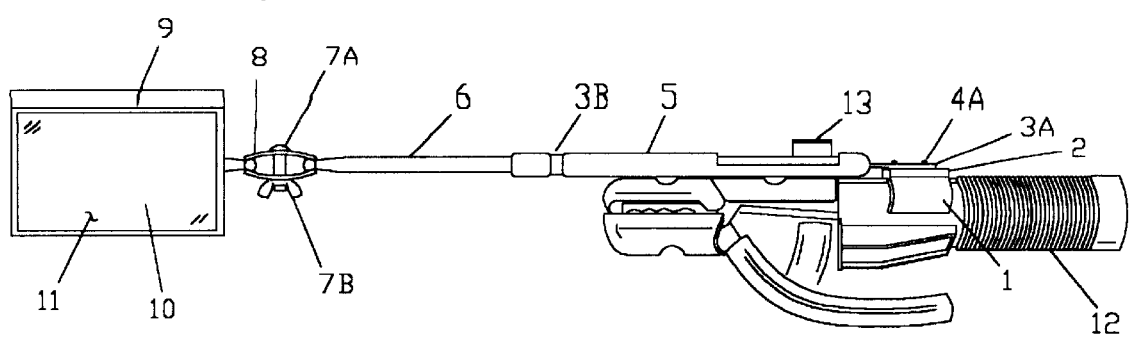
FIG. 8 is a side view showing another embodiment of the electrode holder mirror device with a crescent-shaped trigger mechanism installed on the electrode holder.

Referring to FIGS. 1,2,3 and 4, an embodiment of the invention is shown in which the Electrode Holder Mirror Device is removably installed to the electrode holder 12 handle.

In this embodiment a body structure 1 is shown which is in the form of an open sleeve or C-section having a flange section 2 which the telescoping mirror is attached thereto by mechanical means of screws 4A and nuts 4B. The telescoping mirror has a female member 5 which has a coined surface 3A on one end and a ridge section 3B on the other end a male telescoping member 6 a swivel member 8 having a tension screw 7A and wing nut 7B, a mirror housing member 9 a mirror 10 and a clear protective lens 11.

The body structure 1 opening is located at 180 degrees relative to the flange section 2. The flange section 2 has two holes there through counter sunk on the inner circumfrential surface of the body structure 1 means for the nuts 4B to be below the inner surface and for allowing the screws 4A and nuts 4B to fasten to the female member 5 coined surface 3A to the flange section 2. The female member 5 ridge section 3B means for a resistibly rotating means of the telescoping male member 6 and also a stop for the telescoping male member 6 which has a staked end which will not allow for the telescoping male member 5 to become disengaged when fully extended. The body structure 1 serves for the resilient snap gripped to the electrode holder 12 thereby to ensure a removably attaching means. The body structure is of a strong and resilient non-conductive material, while the female member 5 is of a strong material, the telescoping male member 6 is of a strong material, the mirror housing 9 has a substantial width means for allowing a mirror 10 and clear lens 11 to fit securely therein.

The electrode holder mirror device shown in FIG. 4 can be easily removably attached to the electrode holder 12 by pressing the body structure 1 onto the electrode holder 12 which will encompass the elecrode holder 12 with a snap fit and securing force and removed simply by pulling off from the electrode holder 12. When the Mirror device is installed to the electrode holder 12 the mirror 10 is then adjusted by manual or automatic means allowing proper visual mode before and during the welding process being performed and which allows for a proper welding technique to be applied during the welding process.

Although the description above contains many specificities, these should not be construed as limiting the scope of the invention but as merely providing illustrations of the presently preferred embodiments of this invention. For example, the mirror 10 can have other shapes, such as square, rectangular, oval, round, diamond shaped.; the swivel member 8 can be obtained by other means such as a wire type element, corrugated flex joint, flexible tubing; the screws 4A and nuts 4B fastening means can be obtained such as rivets, clips, screws threaded into the flange section 2. The automatic means of adjustment is from a cresent-shaped trigger mechanism 13 adjusted by the welder before or during the welding process being performed. The body structure 1 and the female member 5 could be molded as one member out of a strong and elastic plastic material. The female member 5, telescoping male member 6, swivel member 8, mirror housing can be made of a metallic material, all metallic parts could be rubber coated so as not to short circuit if the mirror device is accidentally grounded.

I claim:

1. An electrode holder mirror device used for welding purposes comprising:
   a) a body structure which comprises an open sleeve member and a flange section, the open sleeve member manufactured of a strong, resilient and non-conductive material and of sufficient size and configuration to facilitate gripping of an electrode holder when affixed thereto, the flange section functioning to releasably engage a handle portion of an electrode holder through usage of a fastening means; and
   b) a telescoping mirror assembly which comprises a telescoping male member releasably inserted into the open sleeve member at one end thereof, a mirror housing rigidly affixed to a distal end of the telescoping male member, the mirror housing comprising a mirror device therein, and a swivel means rigidly affixed to the distal end of the telescoping male member, the mirror comprising a protective clear lens functioning to protect the mirror from damage and debris, the telescoping male member and swivel means functioning to position the mirror rotationally about its longitudinal and latitudinal axes, allowing the device to be placed in a position to allow a welder to adequately view a process being performed, the electrode holder mirror device removably affixed to an electrode holder by pressing the body structure of the electrode holder mirror device onto the electrode holder in a snap fit, the electrode holder mirror device removable from the electrode holder by pulling the device from the holder manually.

2. The electrode holder mirror device as described in claim 1, wherein the position of the mirror about its longitudinal and latitudinal axes is adjusted manually.

3. The electrode holder mirror device as described in claim 1, wherein the position of the mirror about its longitudinal and latitudinal axes is adjusted automatically.

4. The electrode holder mirror device as described in claim 3, wherein an automatic mirror adjustment means is a substantially crescent-shaped trigger mechanism, functioning to allow a welder to adjust the mirror rotationally about its longitudinal and latitudinal axes while wearing welding gloves.

5. The electrode holder mirror device as described in claim 1, wherein the swivel means is selected from a group consisting of a wire-element, corrugated flex joint, and flexible tubing.

6. The electrode holder mirror device as described in claim 1, wherein the swivel means comprises a tension adjustment means.

7. The electrode holder mirror device as described in claim 1, wherein the telescoping male member comprises a stop with a staked end, functioning to prevent the telescoping male member from disengaging when fully extended and stop increments functioning to allow a welder to adjust a length of the electrode holder mirror device to previously determined settings.

8. The electrode holder mirror device as described in claim 1, wherein the open sleeve member comprises a coined surface functioning to facilitate attachment to the flange section.

* * * * *